United States Patent [19]

Antonello

[11] Patent Number: 4,720,752
[45] Date of Patent: Jan. 19, 1988

[54] SERVOCONTROLLED DEVICE FOR CONTROLLING THE CASSETTE TAPE TRANSPORT MEANS, PARTICULARLY FOR COOPERATION WITH CASSETTE CHANGING DEVICES

[75] Inventor: Flaminio Antonello, Chiasso, Switzerland

[73] Assignee: Neutek Establishment, Vaduz-Liechtestein, Liechtenstein

[21] Appl. No.: 836,532

[22] Filed: Mar. 5, 1986

[30] Foreign Application Priority Data

Mar. 5, 1985 [CH] Switzerland ................ 00996/85

[51] Int. Cl.[4] .................. G11B 15/02; G11B 15/18
[52] U.S. Cl. .................. 360/71; 360/74.1
[58] Field of Search .................. 360/71, 74.1

Primary Examiner—George G. Stellar
Attorney, Agent, or Firm—Cushman, Darby & Cushman

[57] ABSTRACT

The device, of the autoreverse type, conventionally comprises at least one cassette (10) with a magnetic tape (1) which is alternately wound around one of two reels (11' and 11"), also part of the cassette (10). Each reel is keyed and/or keyable to its own shaft (32', 32") with a winding key (31', 31") driven, directly or indirectly, by at least one motor (33), where the tape, extending between the two reels (11' and 11") or idle rollers (12' and 12"), also part of the cassette (10), is transported tangential to two capstans (4', 4") provided with flywheels (40', 40"). At the other side of the tape (1) there are two rollers (41', 41"), each roller being idle-mounted at the symmetrical, swinging end (42', 42") of its own arm (43', 43") and alternately biased by a spring (45) to adhere to the magnetic tape (1) or to two substantially parallel capstans (4', 4"), directly or indirectly driven by one or more motors (35). The device also includes at least one magnetic playback head (44), in wiping contact with the moving tape (1). The device is provided with at least nine tracks or detecting and/or sensing levels (52, 52', 52", 53, 53', 53", 54, 54', 54"), distributed over an odd number of parallel, aligned shafts (50, 50', 50"), and to which all the functional members (6', 6", 7', 7", 9, 09, 42', 42", 154) are linked, either directly or indirectly.

10 Claims, 6 Drawing Figures

SERVOCONTROLLED DEVICE FOR CONTROLLING THE CASSETTE TAPE TRANSPORT MEANS, PARTICULARLY FOR COOPERATION WITH CASSETTE CHANGING DEVICES

This invention relates to a small size servocontrolled device, for controlling the cassette tape transport means in determining the operation modes of a recorder/player in which it is incorporated, and, in particular, for cooperation with cassette changing devices and/or parts thereof.

At the present state of the art, cassette tape recorders/players, of the so-called autoreverse type, comprise at least one magnetic tape which is alternately wound around one of two reels each of which is keyed and/or keyable to a shaft driven, directly or indirectly, by at least one motor where the tape, extending between the two reels, is transported tangential to two capstans provided with flywheels; while at the other side of the tape, there are two rollers, each roller being idle-mounted at the symmetrical, swinging end of its own arm, and alternately biased by a spring to adhere to the magnetic tape or to two substantially parallel capstans, directly or indirectly driven by one or more motors: the recorder/player also includes at least one magnetic playback head, in wiping contact with the moving tape. Such recorders/players substantially are of two types: one type is an independent and self-contained unit, designed for use in a fixed installation where it is subjected to predictable stresses; the second type, also consisting of an assembly, is to be intended as a part of an up-tier system, usually unpredictable and travelling, with the following factors being unknown: the stresses, the system it is made a part of, and, in general, the travelling vehicle where it performs a particular function. As far as operation is concerned, the recorders/players of the second type are, in general, characterized by essential or active modes (six in number) and by accessory or passive modes ranging in number from one to eight, some of which are repetitive.

In particular, since it is a bilateral, symmetrical system, we can say that the essential or active modes are three, namely: record/playback, fast forward, scan, which, because they are applied to the two sides, called side 1 and side 2, of the tape, also making reference to the musicassette, where they are so identified, amount to six. As far as the accessory or optional or passive modes are concerned, the brake mode is undoubtedly prevailing, and is sometimes associated with the tensioning mode. These accessory modes were actuated when switching from one active mode to another and could be accomplished, either in a somewhat approximate manner, by means of a single motor, or, at a higher cost, through the use of two light-armature, so-called ironless motors actuating the tensioning mode by means of an opposite rotation of the reel hubs directly coupled to the motor shafts. Each or both said accessory modes could be repeated during the interval between one active mode and the other.

Furthermore, one feature that differentiates the various types of recorders/players is the mechanism controlling the tape transport means they incorporate, which must be adequate to the specific requirements such as overall size, temperature, position; other requirements are operability and the ability to be combined with special machines, with which they share all pros and cons. The reliability required of these apparatuses imposes a certain grade of professionality in terms of simplicity, ruggedness, strength, compactness. In addition, the cost of all such features is required to be comparable with current costs. Certain malfunctions frequently occur in car-mounted systems which may be subjected to rough vibrations and/or inertial stresses, especially if the system is installed in an unsuitable position. Such malfunctions are due to the slackening and/or unwinding of the tape from the reels. In most cases a slackened tape is uncontrollable to the point of becoming critical and impairing operation of the system which may sometimes be detrimental to people's safety. The causes for tape slackening were not always and/or completely due to external factors. The slackening of the tape could have resulted from such internally originated causes as the failure and/or miscalibration of the reel braking devices, especially when the moments of inertia involved were not duly eliminated and/or compensated for. One of the several methods adopted to keep the tape taut was to have only one reel driven and exploit the inertia of the other reel.

The main object of this invention is to eliminate the above mentioned malfunctions and, in addition, offer several advantages. The inventor, by ingenious intuition, has conceived a substantially mechanic, simple and reliable kinematic device, essentially consisting of nineteen components, namely: a train of three toothed cams, two levers each carrying a brake shoe, a train of four gears slaved to two levers, as well as two driving gear wheels, two springs and four photocells. The three cams have their axes parallel and aligned. The end cams utilize the capstan shafts as their own shafts and operate at four levels, whereas the center cam operates at three levels: the cam cooperates, at the lower levels, with one pair of photocells, and, at the upper level, with the carriage carrying the magnetic head and the pinch rollers, the mutually meshing wheels being located at the intermediate levels. Each of the specularly identical end cams, at the three other levels, cooperates with the brake lever, the tensioning gear swinging levers, respectively, and acts as indicator for the photocells and one track which is touched by the pinch rollers swinging arms. In effect said four cams, able to furnish eight different commands, program all the appreciable functions found in the most sophisticated recorders/players, including uninterrupted tape tensioning during dead times by oppositely rotating the reels.

In order to better explain the characteristics of this invention, reference is made to the description of a practical embodiment made out in a schematic and merely illustrative manner, with reference to the accompanying drawings, in which.

Figure 1:
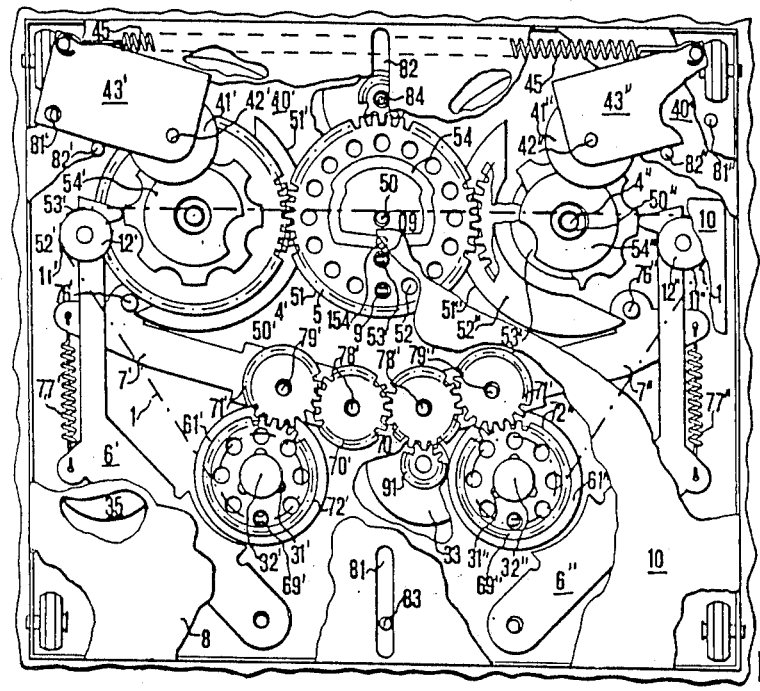
FIG. 1 is a schematic plan view of the device according to this invention, where conventional components, which in the tape tensioning mode are non-operative and would moreover prevent the view of essential components, are not shown.

Referring to the figures shown in the drawings, in which the components that are not essential to the function being illustrated have been either omitted or partially represented, the present device is used in a cassette magnetic tape recorder/player, of the autoreverse type, which conventionally comprises at least one cassette 10 with a magnetic tape 1 which is alternately wound around one of two reels 11' and 11", also part of the cassette 10. Each reel is keyed and/or keyable to its own shaft 32', 32" with a winding key 31', 31" driven, directly or indirectly, by at least one motor 33, where the tape, extending between the two reels 11' and 11" or idle rollers 12' and 12", also part of the cassette 10, is transported tangential to two capstans 4', 4" provided with flywheels 40', 40". At the other side of the tape 1 there are two rollers 41', 41", each roller being idlemounted at the symmetrical, swinging end 42', 42" of its own arms 43', 43" fulcrumed at 81', 81", and alternately biased by a spring 45 to adhere to the magnetic tape 1 or to two substantially parallel capstans 4', 4", directly or indirectly driven by one or more motors 35. The device also includes at least one magnetic playback head 44, in wiping contact with the moving tape 1. Both the head 44 and the pinch rollers 41', 41" are mounted to a carriage 8 and the angular travel of arms 43', 43" is centripetally limited by stopper pins 82', 82" which resist the action of the spring 45. As far as operation is concerned, the recorders/players are, in general, characterized by essential or active modes (six in number) and by accessory or passive modes ranging in number from one to eight, some of which are repetitive. In particular, since it is a bilateral, symmetrical system, we can say that the essential or active modes are three, namely: record/playback (FIG. 4), fast forward (FIG. 2), scan (FIG. 3), which, because they are applied to the two sides, called side 1 and side 2 of the tape, also making reference to the musicassette 10, where they are so identified, amount to six. As far as the accessory or optional or passive modes are concerned, the brake mode (FIG. 5) is undoubtedly prevailing, and is sometimes associated with the tensioning mode (FIG. 1). The skilled in this field are able to recognize said modes in that they are substantially included in all recorders/players, the only differentiating feature being the way they are obtained which is obviously determined by the type of mechanism used.

Each mode of operation is described here below:

TENSIONING MODE

One-way, symmetrical (FIG. 1). In the tensioning mode, at least one of keys 31', 31", or one of reels 11', 11" rotates in the tape 1 winding direction, i.e. the sum of edge speeds in opposite directions, is positive, the optimal condition being the one where the opposite rotation edge speeds, which provide the tensioning of tape 1 are exactly equal in order that the relative position of tape 1 with respect to magnetic head 44 may be constant. During the period this mode is on, the magnetic head 44 and the brakes are at rest, i.e. retracted.

FAST WINDING MODE

Figure 2:
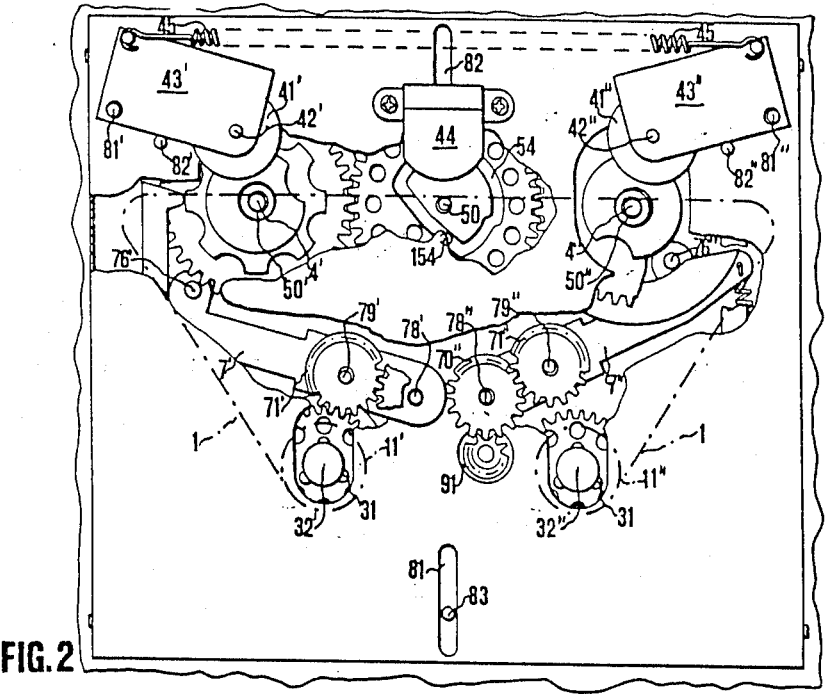
FIG. 2 is a view similar to FIG. 1, with the device being shown in the fast winding condition, on side 1, namely the condition in which the tape is being fast wound about the left reel, as viewed in FIG. 2.

Two-way, two-sided (FIG. 2). In the fast winding mode, one key 31', 31" or one reel 11', 11" is driven fast and made driving, while the other key 31", 31' or reel 11", 11' engaged with it, is idle, to be driven by magnetic tape 1 which is in turn driven by reel 11', 11" or key 31', 31". During the period the fast winding mode is on, the magnetic tape, the brakes, and both the pinch rollers are at rest, i.e. retracted.

SCAN MODE

Figure 3:
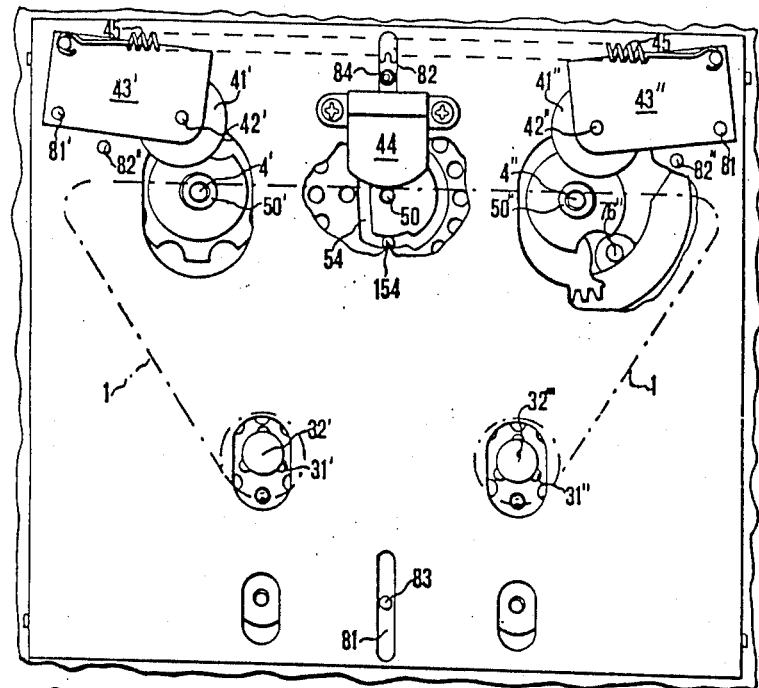
FIG. 3 is a view similar to FIG. 1, with the device being shown in the scan condition, on side 1, which is substantially the same as that shown in FIG. 2 but with the magnetic head near the tape instead of engaging it.

Two-way, two-sided (FIG. 3). In the scan mode, one key 31', 31" or one reel 11', 11" is driven fast and made driving, while the other key 31", 31' or reel 11", 11' engaged with it, is idle, to be driven by magnetic tape 1 which is in turn driven by reel 11', 11" or key 31', 31", whichever is driving. During the period the scan mode is on, magnetic head 44 is brought near to the magnetic tape 1 while the brakes and both the pinch rollers are at rest, i.e. retracted.

RECORD/PLAYBACK MODE

Figure 4:
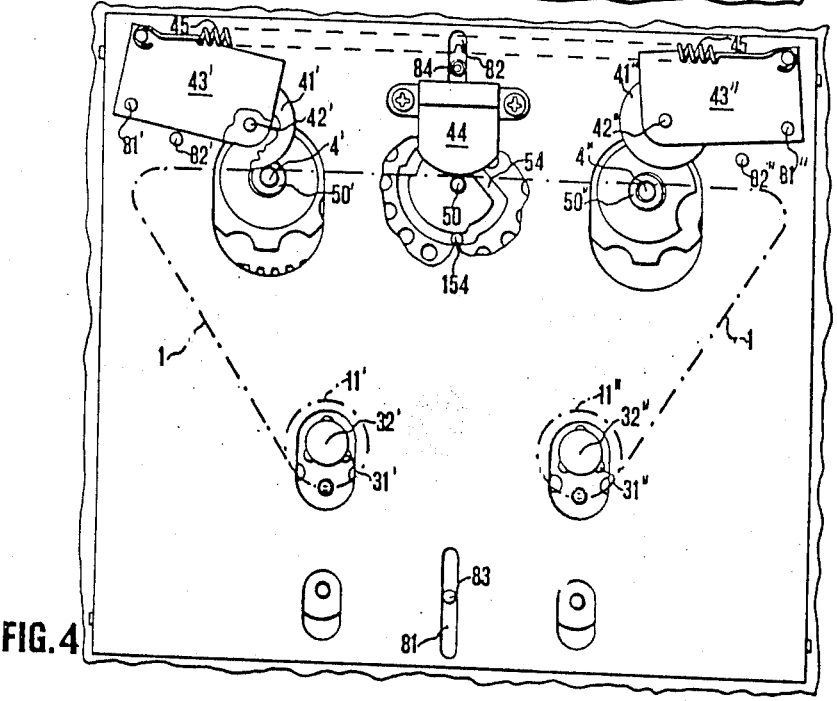
FIG. 4 is a view similar to FIG. 1, with the device being shown in the record/playback or slow forward condition, with the tape being wound around the left reel, as viewed in FIG. 4, on side 1, with the magnetic head adhering to the tape or in the playback mode.

Two-way, two-sided (FIG. 4). In the record/playback mode, one pinch roller 41', 41" presses the tape 1 against the corresponding capstan 4', 4" which is always driving; the corresponding key 31', 31" or reel 11', 11" are in the driving condition to recover the magnetic tape 1, downstream the magnetic head 44 which is active and engages tape 1. Correspondingly, the other key 31", 31' or reel 11", 11' is idle. During the period the record/playback mode is on, the brakes are retracted.

BRAKE MODE

Symmetrical, two-way, repetitive. In the brake mode, both reels 11', 11" or the elements connected to them, are prevented from rotating. When this mode is on, the magnetic head 44 and both the pinch rollers 41', 41" are at rest, i.e. retracted.

The conventional components and modes of operation described so far, are slaved to a device, not shown, which may be different according to the type of apparatus used, as mentioned in the forward.

According to this invention, a substantially mechanic, simple and reliable kinematic device, substantially comprises a relatively small number of essential components, including: three cams 5', 5, 5". These three cams are toothed at a level 51', 51, 51" thereof, respectively, where they mesh with precise unity ratio. The cams also have other levels which will be described later. In addition, the device includes: two levers 6', 6", each carrying one brake shoe 61', 61"; a set of four gears 71', 70', 70", 71", mounted to two levers 7' and 7", as well as two driving, toothed wheels 91, 92 two springs 77', 77", and four photocells. The shafts 50', 50, 50" of the three cams 5', 5, 5" are parallel and aligned, and the end cams 5', 5" utilize the capstan shafts 50', 50" as their own shafts. The two end cams operate at three levels, as will be described later, besides the meshing level mentioned previously. The center cam 5, pivoted on 50, works on three tracks or levels 52, 53, 54: 53 consists of only one hole and cooperates with photocell 09 to indicate the zero or rest position; track 52, consisting of as many holes as are the functional positions (sixteen in this case), cooperates with photocell 9; at the upper level, 54 cooperates with pivot 154 on carriage 8, carrying the magnetic head 44, which is guided at 81 and 82 by guide rods 83 and 84.

At the three other levels 52', 52", 53', 53", 54', 54", each of the specularly identical end cams 5', 5" cooperates, respectively, with the lever 6', 6" which carries brake shoe 61', 61", and the lever 7', 7" which imparts a swinging motion to gear 71', 71", and acts as indicator for photocell 9', 9" and one track 54', 54", touched by arm 43', 43", which imparts a swinging motion to pinch roller 41', 41". The three cams 5', 5, 5" are substantially able to supply eight different types of commands, and program all the appreciable functions of the recorder/player. The system described above is driven by two motors 33, 34, coupled with gear 91, which drives gear 70", and with gear 92, which drives cam 5, respectively. A third motor 35, shown in FIG. 6 only, also because it is a conventional component, drives a conventional transmission, not shown, which imparts motion to the shafts 4', 4", or flywheels 40', 40".

Figure 6:
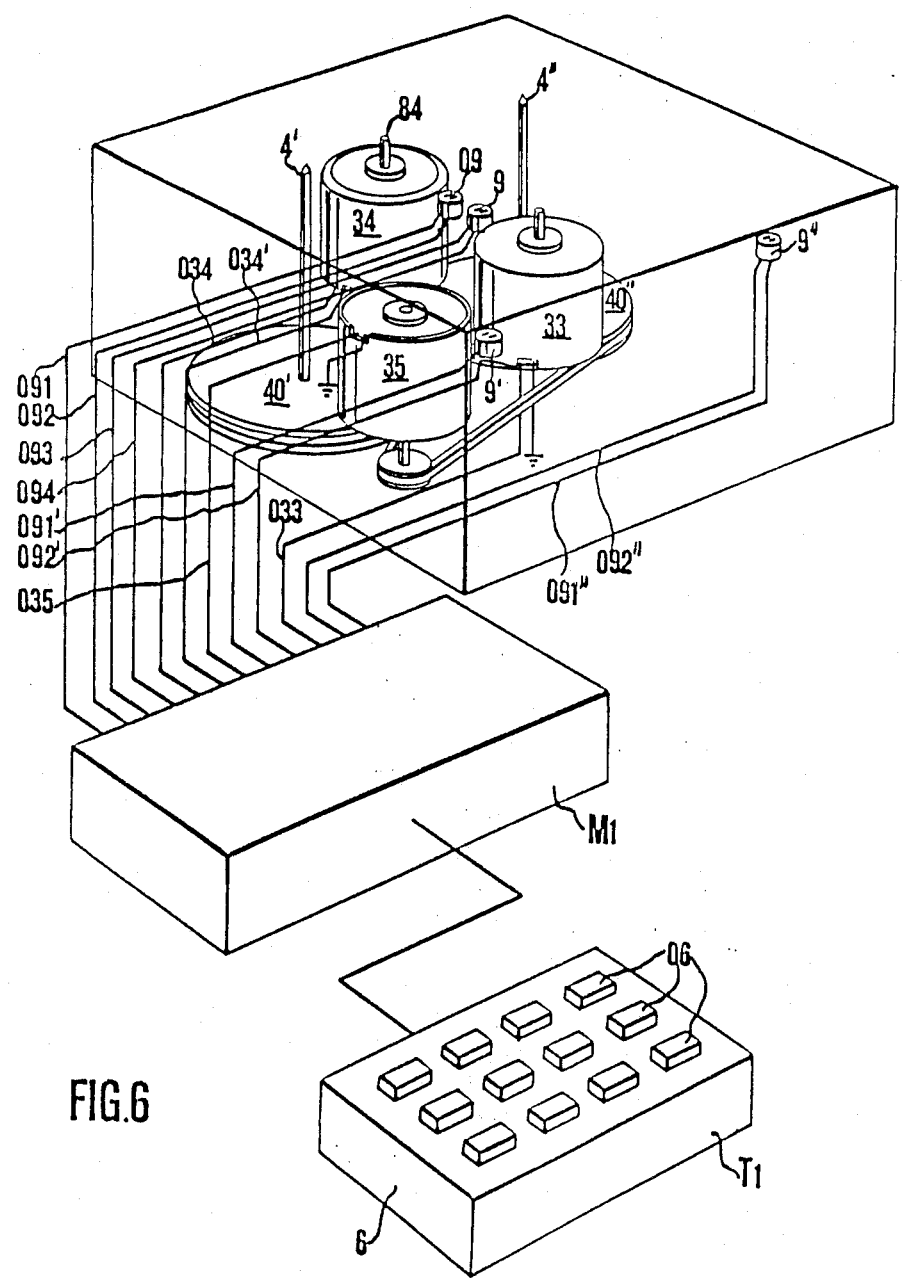
FIG. 6 is a schematic overall perspective view of this device, showing the elements that are relevant from the electrical point of view, as well as the external devices performing servocontrol functions.

FIG. 6 represents in the form of blocks, the internal and external substantially electric/electronic or electromechanical system, associated with the present device. Said figure also shows a tridimensional view of the present device, where "L" is the length, namely 98 mm, which is less than the corresponding 102-mm length of the cassette 10; "l" is the width which is approximately less than 1.5 times the widht of the cassette 10. Height "h" is also the same as the plan width of the cassette, that is, the four side areas of the parallelepiped have the same dimensions as cassette 10 in plan. The parallelepiped view includes the two single-direction motors 33, 35 with poles 033, 035, the reversible motor 34 with two poles 034, 034', and the four photocells 9, 09, 9', 9", with their poles 091, 092, 093, 094, 091', 092', 091", 092", respectively. Said twelve terminals 033, 034, 034', 035, 091, 092, 093, 094, 091', 092', 091", 092", are first connected to interface card S, which is powered by A, and then to microprocessor M1 which receives instructions from keyboard T1.

From the foregoing, the operation of the present device appears to be simple and self-explanatory, however, a short description is provided also to verify that the planned conditions are implemented, in a simple manner, by the device according to this invention.

In the rest mode, the device is substantially in the condition represented in FIG. 1. More precisely, after a cassette has been inserted into the device with its splines engaged with mating keys 31', 31", and, obviously, power has been applied to the system, whatever function is entered through keyboard T1, will start motor 35 (FIG. 6) which will cause rotation of shafts 4', 4", freely revolving within the holes provided on the cassette. At the same time, photocells 9', 9", 9 and 09 will be activated. These photocells are located opposite the reference holes provided, such as, for instance, holes 69', 69" bored on gears 72', 72", as well as holes 52, 53 on cam 5 corresponding to the positions of cams 5', 5, 5" and levers 6', 6"; 7', 7", shown in FIG. 1.

When the system is in the rest condition, the tensioning mode, described previously, can be set by simply entering a function that applies power to motor 33. In fact this gives rise to all the mode conditions previously declared with reference to said tensioning mode. Reel 11' driven by key 31', in turn driven by gear train 91, 70", 70', 71', 72', will be imparted a counterclockwise rotary motion, i.e. in the same running direction of motor 33 so preset to that purpose. Concurrently, key 31" or reel 11", though driven by the same source, namely motor 33 and gears 91 and 70", will be imparted a clockwise rotary motion because an odd number of gears (gear 71" only) separates it from the final driven gear 72". The concurrent opposite rotation of the reels 11', 11" occurring while the head 44 is retracted from the tape 1 and the brakes are deactivated, yields the desired tensioning mode condition which will not cease until the permanently excited photocells, indicate that motion has ceased as determined by holes 69', 69" no longer passing in front of photocells 9', 9", which means that tape 1 is tensioned. In order to switch to the fast winding mode i.e. the condition shown in FIG. 2, proceeding from FIG. 1, it is necessary to first set the brake mode, which is described below, with reference to FIG. 5. As power is applied to the reversible motor 34, to make it run counterclockwise, gears 92, 51 will be driven in succession and cam 5 will be imparted a clockwise rotary motion. Photocell 9 is assigned the task of counting the equiangular positions, based on the passage in front of the photocell of two of the sixteen holes 52, corresponding to a 45-degree angle run by cams 5', 5, 5". At the end of the 45-degree angle, the corresponding tooth of track or level 53", on cam 5", will abut against pivot 76" at the driving end of second-type lever 7", and, by overcoming the counteraction of spring 77", will revolve around its own pivot 78", shared with gear 70", thus causing the teeth of gear 71" to disengage from the teeth of gear 72", which will become idle together with key 31" and associated reel 11". Under these conditions, motor 33 starts fast winding by fast driving, through gears 91, 70", 70', 71', 72', the reel 11' in the counterclockwise direction. In that way, the system will be set to fast winding mode, while the magnetic head 44, the brakes 6', 6", and both the pinch rollers 41', 41" are at rest, i.e. retracted. As the operator resolves to stop the fast winding mode, the stop signal for motor 33 is conditioned by the starting of motor 34, necessary and sufficient to make cam 5" to travel through an angle such as to make one of the eight concave portions of tracks 52', 52", to line up with teeth 65', 65". That causes levers 6', 6", carrying brake shoes 61', 61", to be slaved to the action of springs 77', 77" which bias the brake shoes against a track 172', 172" on gear 72', 72". Power will be removed from motor 33 with a delay such as to allow total dissipation of the kinetic energy which would otherwise cause the tape 1 to slacken and unwind.

The scan mode is set by first returning the system to the fast winding mode which was described above. In setting the scan mode, motor 34 is restarted which causes cams 5', 5, 5" to move through a 45-degree angle, so that the set-up shown in FIG. 2 will change as shown in FIG. 3. Here, it can be seen that the magnetic head 44, has been drawn near to the tape 1 so as to touch it. The new position of head 44 has been determined by carriage 8 having been shifted, as driven by pivot 154, to engage with the slot 54 of cam 5. The scan mode is stopped by the same procedure as described for the fast winding mode.

Switching from the scan mode to the record/playback mode, still on side 1, involves the temporary restarting of motor 34, such as to cause the set of three cams 5', 5, 5", to move through a further 45-degree angle, as shown in FIG. 4, where pivot 154, engaged into the slot 54, has dragged carriage 8, carrying head 44, to adhere to tape 1. Pivot 154 has also brought the pinch rollers 41', 41", whose arms 43', 43" are permanently urged by the spring 45 towards capstans 4', 4". Whereas under conditions other than the one being discussed, said pinch rollers would not be able to reach the capstans, because of their travel limits, here the shifted carriage 8 alternately brings them into contact with either capstan 4' or capstan 4" thus causing tape 1 to be transported in the desired direction. In the meantime, motor 33 has been restarted, some time ahead, to wind tape 1 delivered by the 41'-4' combination, and upstream taken up from reel 11" which is now idle.

Figure 5:
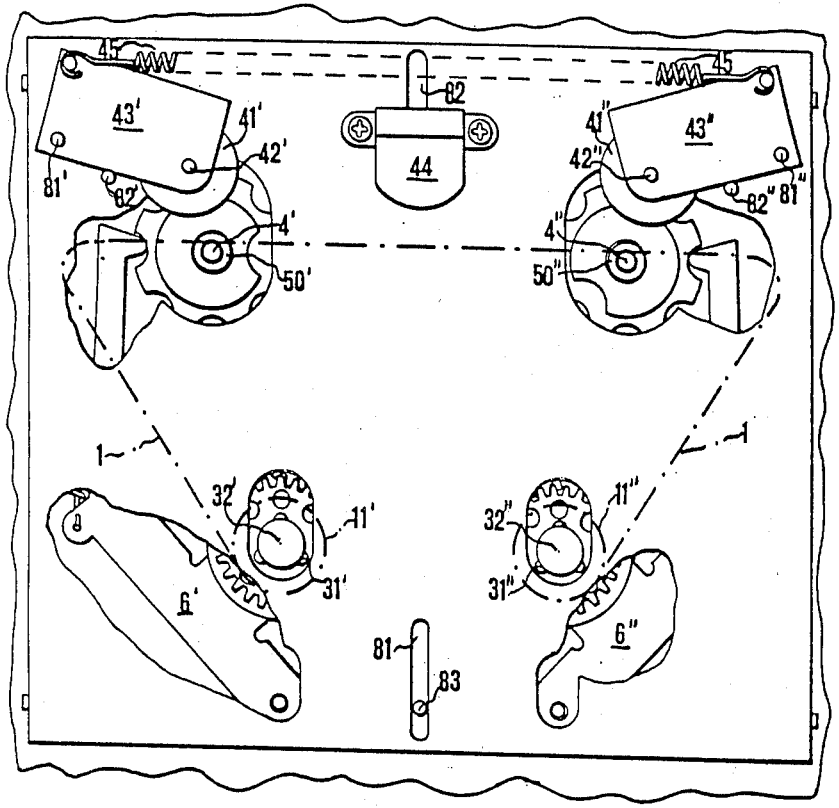
FIG. 5 is a view similar to FIG. 1, with the device being shown in the so-called braked transition condition.

The brake mode, occurring at each angle position of cams 5', 5" at which a hollow portion of cams 52', 52" faces a tooth 65', 65", was described previously when discussing the fast winding stop function with reference to FIG. 5, which function is a further case in which this mode takes place.

What is claimed is:

1. A small size servocontrolled mechanism for controlling the cassette tape transport means, in determining the operation modes of an autoreverse type recorder/player in which it is incorporated. conventionally having at least one cassette (10) with a magnetic tape (1) which is alternately wound around one of two reels (11', 11"), also part of the cassette (10), each reel being keyed and/or keyable to its own shaft (32', 32") by means of a winding key 31', 31") driven, directly or indirectly, by at least one motor (33), the tape (1) extending between the two reels (11'and 11") or idle rollers (12', 12"), also part of the cassette (10), being transported tangential to two capstans (4', 4") provided with flywheels (40', 40"), at the other side of the tape (1) two rollers (41', 41"), each roller being idle-mounted at the symmetrical, swinging end (42', 42") of its own arm (43', 43") and alternately biased by a spring (45) to adhere to the magnetic tape (1) or to the two substantially parallel capstans (4', 4"), directly or indirectly driven by one or more motors (35), and at least one magnetic playback head (44), in wiping contact with the moving tape (1), characterized in that said device comprises at least nine tracks or touching and/or sensing levels (52, 52', 52", 53, 53', 53", 54, 54', 54"), distributed over an odd number of parallel, aligned shafts (50, 50', 50"), and to which all the functional members (6', 6", 7', 7", 9, 09, 42', 42", 154) are linked, either directly or indirectly.

2. A small size servocontrolled device for controlling the cassette tape transport means, according to claim 1, characterized in that the odd number of shafts on which are distributed said tracks (52, 52', 52", 53, 53', 53", 54, 54', 54") is at least three (50, 50', 50") whose side ones (50', 50") carry mirror-like tracks (52', 53', 54') (52", 53", 54") and are interconnected, through sprockets (51, 51', 51") with unity gear ratio, so as to ensure the precise angular correspondence of all tracks (52', 53', 54') (52, 53, 54) (52", 53", 54") over the entire circle, the intermediate track shaft (50) being located exactly on the center line of the shafts (50', 50") of the capstans (4', 4").

3. A device, according to claim 2, characterized in that the position of side axes (50', 50") of tracks or cams, adjacent to the center shaft (50) is determined by the axis (51', 51") of the capstans (4', 4") by making the shafts (50', 50") of said tracks apt to idle receive the packs (5', 5") of such cams or tracks.

4. A device, according to claim 2, characterized in that four (52', 52": 53', 53") of the nine cams (52, 52', 52", 53, 53', 53", 54, 54', 54") are touched by four two-by-two mirror-like levers (6', 6": 7', 7"), of which one pair (6', 6") carries brake shoes (61', 61"), and the other pair (7', 7") controls the engaging, disengaging, and reversal of transmission direction of seven gears (91, 70", 70', 71', 72', 71", 72"), two cams (54', 54") being touched by two capstan-carrying arms (43', 43"), two other cams (52, 53) being electronically detected, respectively, by as many sensors (9, 09), to indicate the only zero position (09 - 53) and the several positions (9 - 52) into which the circle is subdivided, and one two-way cam (54), necessarily in the center position, being engaged by a member (154) integral with a carriage (8) which carries head (44) and pinch rollers (41', 41") located at the swinging end of said arms (43', 43") fulcrumed (at 81', 81") on a pin integral with the carriage (8).

5. A device according to claim 4, characterized in that the seven drive gears (91, 70", 70', 71', 72', 71", 72") that drive the keys (31', 31") and winding reel hubs (11', 11"), are mounted in an " M" configuration, whose upper part, consisting of two pairs of gears (70', 71'; 70", 71") is arranged in such a way that the two adjacent, mutually meshing center gears (70', 70") are mounted around two shafts (78', 78") which are the pivot of two (7', 7") second-type levers, whose drive ends (76', 76") touch two (52', 52") of the nine cams (52, 52', 52", 53, 53', 53", 54, 54', 54") each of said levers in turn bringing in the resistance, hence swinging, position, one gear (71', 71") which meshes, on one side, permanently with gear (70', 70") coaxial with the pivot (78', 78") and on the other side, is generally biased by a spring (77', 77") to mesh with a gear (72', 72") slaved to the corresponding winding reel (11', 11") and gets disengaged from said gear in response to touching movements of the sensing drive end (76', 76").

6. A device according to claim 4, characterized in that said two second-type levers (6', 6"), whose drive ends (65', 65") touch said cams (53',53"), carry in the resistance position, therefore swinging in response to the touching movements which tend to force the levers to open, and due to the combined action of springs (77', 77") that permanently tend to force them to close, brake shoes (61', 61") which adhere to and, therefore, brake tracks (172', 172") integral with the gears (72', 72") respectively.

7. A device according to claim 1 characterized in that the center cam controlling the position of carriage (8) carrying the head (44), is located on the top, is double acting, and its symmetrical configuration produces the following modes of operation in succession, starting from a zero position (FIG. 1):

0 degrees = tensioning
±-22.5 degrees = brake
±-45 degrees = fast forward
±-67.5 degrees = brake
±-90 degrees = scan
±-112.5 degrees = brake
±-135 degrees = record/playback
±-157.5 degrees = brake
±-180 degrees = tensioning.

8. A device according to claim 1 characterized in that said cams (54', 54") coacting with pinch rollers (41', 41") or respective arms (43', 43"), have a track (54', 54") which, through the major part of its extension, exerts on pinch rollers (41', 41") a centrifugal reactive force opposing the centripetal movement of pinch roller (41', 41") normally biased in said direction by a spring (45), and through only one concave angle fraction, the centripetal movement is allowed, said concave angle producing a substantially inverse effect on the two pinch rollers (41', 41").

9. A device according to claim 1 characterized in that for the servocontrol operation there are substantially twelve terminals (033, 034, 034', 035, 091, 092, 093, 094, 091', 092', 091", 092") eight of which (091, 092, 093, 094, 091', 091", 092") are connected to the poles of the four photocells (9, 09, 9', 9"), two are connected to the poles of the two single-direction motors (33, 35), and two are connected to the two poles (034, 034') of the reversible motor (34), the remote control being accomplished from a keyboard (T1) through a microprocessor (M1).

10. A device according to claim 1 particularly to be associated to cassette changing devices able to deliver one cassette (10) at a time, as well as retrieve said cassette (10), characterized in that it has a rectangular plan section whose length is little less than the cassette (10) which measures 102 mm, and whose width is less than 1.5 times the cassette (10) which measures 64 mm, the side areas of the device parallelepiped overall size being substantially the same in shape and dimensions as those of the cassette (10) in plan.

* * * * *